(12) United States Patent
Monroe (10) Patent No.: US 7,768,566 B2
(45) Date of Patent: Aug. 3, 2010

(54) DUAL-MODE CAMERA

(76) Inventor: David A Monroe, 720 Lincoln Center, 7800 IH-10 West, San Antonio, TX (US) 78230

( * ) Notice: Subject to any disclaimer, the term of this patent is extended or adjusted under 35 U.S.C. 154(b) by 592 days.

(21) Appl. No.: 11/617,368

(22) Filed: Dec. 28, 2006

(65) Prior Publication Data

US 2007/0182840 A1     Aug. 9, 2007

Related U.S. Application Data (60) Continuation of application No. 11/398,508, filed on Apr. 5, 2006, now Pat. No. 7,551,219, and a division of application No. 09/593,901, filed on Jun. 14, 2000, now Pat. No. 7,057,647.

(51) Int. Cl.
*H04N 5/222*     (2006.01)
*H04N 5/225*     (2006.01)

(52) U.S. Cl. .............. 348/333.05; 348/333.11; 348/217.1

(58) Field of Classification Search ............ 348/333.05, 348/333.11, 217.1, 164, 333.18
See application file for complete search history.

(56) References Cited

U.S. PATENT DOCUMENTS

| | | |
|---|---|---|
| 4,163,283 A | 7/1979 | Darby |
| 4,179,695 A | 12/1979 | Levine et al. |
| 4,197,526 A | 4/1980 | Levine |
| 4,516,125 A | 5/1985 | Schwab et al. |
| 4,646,140 A * | 2/1987 | Bailey et al. .............. 348/217.1 |
| 4,831,438 A | 5/1989 | Bellman, Jr. et al. |
| 4,845,629 A | 7/1989 | Murge |
| 4,857,912 A | 8/1989 | Everett, Jr. et al. |
| 4,891,650 A | 1/1990 | Sheffer |
| 4,910,692 A | 3/1990 | Outram |
| 5,027,104 A | 6/1991 | Reid |
| 5,027,114 A | 6/1991 | Kawashime et al. |
| 5,091,780 A | 2/1992 | Pomerleau |
| 5,109,278 A | 4/1992 | Erickson |
| 5,111,291 A | 5/1992 | Erickson |
| 5,166,746 A | 11/1992 | Sato et al. |

(Continued)

FOREIGN PATENT DOCUMENTS

EP     220752     5/1987

(Continued)

OTHER PUBLICATIONS

Apr. 1966, Apollo Unified S-Band System, NASA-Goddard Space Flight Center, Greenbelt, Maryland.

(Continued)

*Primary Examiner*—James M Hannett (57) ABSTRACT

A dual camera system uses a single lens and no moving parts in the optical path. A single lens directs a desired scene to a partially reflective beamsplitting mirror, thence to a pair of image sensors. For day/night operation, one sensor may be optimized for nighttime sensitivity, while the other is optimized for daytime operation. Alternatively, one optical path may have greater magnification, thus allowing electronic zooming with no resolution loss. The system may be enhanced with an image intensifier for nighttime operation; digital sensors for improved resolution, or orthogonal gyroscopic accelerometers for image stabilization. Additionally, the monochrome and color images may be produced simultaneously and 'fused' algorithmically, yielding an improvement in sensitivity and color resolution compared with a conventional color camera.

4 Claims, 10 Drawing Sheets

U.S. PATENT DOCUMENTS

| | | | |
|---|---|---|---|
| 5,218,367 A | 6/1993 | Sheffer et al. | |
| 5,243,340 A | 9/1993 | Norman et al. | |
| 5,243,530 A | 9/1993 | Stanifer et al. | |
| 5,268,698 A | 12/1993 | Smith, Sr. et al. | |
| 5,283,643 A | 2/1994 | Fujimoto | |
| 5,321,615 A | 6/1994 | Frisbie et al. | |
| 5,334,982 A | 8/1994 | Owen | |
| 5,341,194 A | 8/1994 | Haneda et al. | |
| 5,400,031 A | 3/1995 | Fitts | |
| 5,408,330 A | 4/1995 | Squicciarini et al. | |
| 5,432,838 A | 7/1995 | Purchase et al. | |
| 5,440,337 A | 8/1995 | Henderson et al. | |
| 5,440,343 A | 8/1995 | Parulski | |
| 5,448,243 A | 9/1995 | Bethke et al. | |
| 5,463,595 A | 10/1995 | Rochall et al. | |
| 5,469,371 A | 11/1995 | Bess | |
| 5,497,149 A | 3/1996 | Fast | |
| 5,508,736 A | 4/1996 | Cooper | |
| 5,509,009 A | 4/1996 | Laycock | |
| 5,530,440 A | 6/1996 | Denzer et al. | |
| 5,553,609 A | 9/1996 | Chen et al. | |
| 5,557,254 A | 9/1996 | Johnson et al. | |
| 5,557,278 A | 9/1996 | Piccirillo et al. | |
| 5,598,167 A | 1/1997 | Zijderhand | |
| 5,612,668 A | 3/1997 | Scott | |
| 5,627,753 A | 5/1997 | Brankin et al. | |
| 5,629,691 A | 5/1997 | Jain | |
| 5,636,122 A | 6/1997 | Shah et al. | |
| 5,642,285 A | 6/1997 | Woo | |
| 5,666,157 A | 9/1997 | Avid | |
| 5,670,961 A | 9/1997 | Tomita et al. | |
| 5,677,979 A | 10/1997 | Squicciarini | |
| 5,689,442 A | 11/1997 | Swanson | |
| 5,712,679 A | 1/1998 | Coles | |
| 5,712,899 A | 1/1998 | Pace, II | |
| 5,714,948 A | 2/1998 | Farmakis et al. | |
| 5,742,336 A | 4/1998 | Lee | |
| 5,751,346 A | 5/1998 | Dozier | |
| 5,777,551 A | 7/1998 | Hess | |
| 5,777,580 A | 7/1998 | Janky et al. | |
| 5,793,416 A | 8/1998 | Rostoker et al. | |
| 5,825,283 A | 10/1998 | Camhi | |
| 5,835,059 A | 11/1998 | Nadel et al. | |
| 5,850,180 A | 12/1998 | Hess | |
| 5,867,804 A | 2/1999 | Pilley et al. | |
| 5,917,405 A | 6/1999 | Joso | |
| 5,926,210 A | 7/1999 | Hackett et al. | |
| 5,933,098 A | 8/1999 | Haxton | |
| 5,938,706 A | 8/1999 | Feldman | |
| 5,974,158 A | 10/1999 | Auty et al. | |
| 5,983,161 A | 11/1999 | Lemelson et al. | |
| 5,995,141 A * | 11/1999 | Hieda | 348/208.6 |
| 5,999,116 A | 12/1999 | Evers | |
| 6,002,427 A | 12/1999 | Kipust | |
| 6,009,356 A | 12/1999 | Monroe | |
| 6,067,571 A | 5/2000 | Igarashi et al. | |
| 6,069,655 A | 5/2000 | Seeley | |
| 6,078,850 A | 6/2000 | Kane et al. | |
| 6,084,510 A | 7/2000 | Lemelson et al. | |
| 6,092,008 A | 7/2000 | Bateman | |
| 6,100,964 A | 8/2000 | De Cremiers | |
| 6,133,941 A | 10/2000 | Ono | |
| 6,154,658 A | 11/2000 | Caci | |
| 6,157,317 A | 12/2000 | Walker | |
| 6,181,373 B1 | 1/2001 | Coles | |
| 6,195,609 B1 | 2/2001 | Pilley et al. | |
| 6,226,031 B1 | 5/2001 | Barraclough et al. | |
| 6,246,320 B1 | 6/2001 | Monroe | |
| 6,259,475 B1 | 7/2001 | Ramachandran et al. | |
| 6,275,231 B1 | 8/2001 | Obradovich | |
| 6,278,965 B1 | 8/2001 | Glass et al. | |
| 6,282,488 B1 | 8/2001 | Castor et al. | |
| 6,292,098 B1 | 9/2001 | Ebata | |
| 6,356,625 B1 | 3/2002 | Castellani et al. | |
| 6,385,772 B1 | 5/2002 | Courtney | |
| 6,424,370 B1 | 7/2002 | Courtney | |
| 6,462,697 B1 | 10/2002 | Klamer et al. | |
| 6,476,858 B1 | 11/2002 | Ramirez Diaz et al. | |
| 6,504,479 B1 | 1/2003 | Lemons | |
| 6,522,352 B1 | 2/2003 | Strandwitz et al. | |
| 6,525,761 B2 | 2/2003 | Sato et al. | |
| 6,549,130 B1 | 4/2003 | Joso | |
| 6,556,241 B1 | 4/2003 | Yoshimura et al. | |
| 6,570,610 B1 | 5/2003 | Kipust | |
| 6,628,835 B1 | 9/2003 | Brill | |
| 6,633,333 B1 * | 10/2003 | Spencer | 348/272 |
| 6,646,676 B1 | 11/2003 | DeGrace | |
| 6,662,649 B1 | 12/2003 | Knight et al. | |
| 6,675,386 B1 | 1/2004 | Hendricks et al. | |
| 6,698,021 B1 | 2/2004 | Amini | |
| 6,720,990 B1 | 4/2004 | Walker et al. | |
| 7,113,971 B1 | 9/2006 | Ohi et al. | |
| 2003/0071899 A1 | 4/2003 | Joso | |
| 2005/0055727 A1 | 3/2005 | Creamer et al. | |
| 2005/0138083 A1 | 6/2005 | Smith-Semedo et al. | |

FOREIGN PATENT DOCUMENTS

| | | | |
|---|---|---|---|
| EP | 232031 | 8/1987 | |
| EP | 532110 | 3/1993 | |
| EP | 209397 | 7/1993 | |
| EP | 613109 | 8/1994 | |
| EP | 613110 | 8/1994 | |
| EP | 613111 | 8/1994 | |
| EP | 744630 | 11/1996 | |
| EP | 785536 | 7/1997 | |
| JP | 6-301898 | 10/1994 | |
| JP | 9-282600 | 10/1997 | |
| JP | HEI-10-66058 | 3/1998 | |
| JP | A-10-155040 | 6/1998 | |
| JP | 9-251599 | 4/1999 | |
| JP | 11-160424 | 6/1999 | |
| WO | WO90/04242 | 4/1990 | |
| WO | WO-90/05426 | * 5/1990 | |
| WO | WO95/27910 | 10/1995 | |
| WO | WO96/12265 | 4/1996 | |
| WO | WO9737336 | 10/1997 | |
| WO | WO98/52174 | 11/1998 | |

OTHER PUBLICATIONS

Nov. 24, 1976, TELEXIS ViaNet General Information Booklet Version 1.3.

2000, ViaNet 3000 Administrator's Manual Version 1.1-NetXpress Video by TELEXIS; Kanata, Ontario, Canada.

1999, ViaNet 3000 Operator Manual Version 1.0 by TELEXIS-NetXpress Video, Kanata, Ontario, Canada.

1999, ViaNet 3000 Administrator Manual Version 1.0-NetXpress Video by TELEXIS Kanata, Ontario, Canada.

1999, ViaNet 3000 Instruction Manual Operator's Revision 1-NetXpress Video by TELEXIS, Kanata, Ontario, Canada.

* cited by examiner

DUAL-MODE CAMERA

CROSS REFERENCE TO RELATED APPLICATIONS

This application is a continuation of patent application Ser. No. 11/398,508 filed on Apr. 4, 2006 now U.S. Pat. No. 7,551,279 and entitled "Duel-Mode Camera." The present patent application is a divisional of, and claims the benefit of, patent application Ser. No. 09/593,901 filed on Jun. 14, 2000, now U.S. Pat. No. 7,057,647 titled "Dual-Mode Camera," the entire contents of which are enclosed by reference here-in.

BACKGROUND OF THE INVENTION

1. Field of the Invention

The subject Invention is generally related to cameras and sensors and is specifically directed to a camera design that may use multiple imagers for day/night imaging, or for variable zoom. The design overcomes deficiencies of prior-art cameras wherein moving parts were required in the optical path, or wherein electronic zooming reduced image resolution. The cameras described may be either analog or digital.

2. Discussion of the Prior Art

Video cameras have become commonplace in modern life. Improvements in process technology have resulted in cameras offering high performance at steadily decreasing prices. While early cameras universally used vacuum-tube technology, modern cameras are solid-state devices using CMOS or CCD technology.

CCD and CMOS image sensors are typically organized into a planar array of photosensitive cells in orthogonal axes. When gated ON, each cell accumulates incident photons, yielding a net electrical charge in the cell. At the end of a defined exposure time, the accumulated charges are sequentially transferred from the exposed cells via switched-capacitor techniques.

Since the individual cells are merely accumulators of photons, they offer little or no inherent discrimination between various wavelengths of light. Indeed, such sensor arrays are often used for imaging using near- or far-infrared illumination. As a result or this broad-bandwidth behavior, such cameras are useful to produce monochrome video.

The overall dynamic range of such image sensors is limited. The top end of the dynamic range is limited by the cell's maximum-voltage capacity. That is, once the cell voltage has reached some specified maximum value (typically in the range of 1 to 5 volts), the cell is unable to retain any additional photon-induced charges.

The bottom end of the cell's dynamic range, which defines its sensitivity to low lighting conditions, is limited by imperfections in the array. There are two primary mechanisms. First, cell-to-cell nonuniformities exist in cell geometry, dark current, and sensitivity. These nonuniformities result in a fixed-noise pattern superimposed on images produced by the camera, even in the presence of a uniform illuminant. Second, thermal noise directly creates dynamic cell-to-cell voltage inequalities, which appear as 'snow' in rendered scenes. These two sources of noise limit the ultimate sensitivity of the system at low levels of illumination, since the effective signal-to-noise ratio decreases as illumination decreases.

A further reduction in sensitivity results if the array is configured to render color images. To render color images, the front surface of the array is overlaid with a color filter array such that adjacent cells are sensitive to different colors. A variety of such color filter schemes exist, including RGB, YCrCb, and Bayer patterns. While this enhancement does provide the array with a means to render color imagery, it reduces the overall sensitivity of the array. This reduction in optical sensitivity is due both to the non-ideal transmissivity of the filter to the desired wavelength, as well as to the elimination of energy at the remaining (non-desired) visible wavelengths.

Due to the ongoing advancement of digital techniques, a trend towards image sensors of ever-increasing resolution is evident. When the primary market for cameras was in television-related fields, there was not much demand for cameras to exceed the traditional 350 TV lines/480 scan lines common to broadcast television. Since then, a variety of video applications have emerged, driven by the emerging interne, digital still photography, and HDTV technologies. As a result, higher-resolution image sensors are in demand and are increasingly available. These higher-resolution imagers aggravate the problems of low-light sensitivity due to both their smaller cell geometries, and to the (typically) shorter exposure times they employ.

Many visual surveillance applications demand superior performance under very subdued illumination, such as night imaging with moonlight or even starlight as the ambient illuminant. While some progress has been made in improving the sensitivity of monochrome CCD imagers, such as the Watec 902H, the imagers remain insufficiently sensitive for moonlight or starlight operation. Conventional CCD or CMOS imagers are unable to produce usable video under these conditions. This problem has been remedied by the use of image intensifier technologies. These devices typically use a thin wafer of microscopically perforated opaque photoelectric material, biased by a strong electric field. Photons incident on the front of the plate produce an avalanche of photoelectrons through the microscopic pore, and energize a phosphor coating on the rear of the wafer. Currently available devices may exhibit luminous gains of perhaps 0.1 Foot-Lambert per footcandle, which is enough to allow their use under starlight-illuminated conditions. Various night vision scope, or the commercial OWL products produced by B. E. Meyer.

These image-intensifier devices have several operational limitations. First, the devices may be damaged if operated at 'normal' illuminations, such as daylight. Recent 'gated' and 'filmed' designs largely eliminate this problem. Also, these image-intensifier devices are not capable of rendering color scenes and are thus used in monochrome systems only.

As a result of the foregoing, separate cameras are generally required for operation under very low illuminations and for normal-to-low conditions. Prior-art systems not only use two image sensors; they use entirely separate optical paths including lenses. While this approach has utility, a significant weight and size penalty is incurred by the duplication of the lenses. This is particularly the case with night-vision cameras, which necessarily use very large lenses (160 mm and 310 mm lenses are commonplace) to increase the photon capture aperture of the system.

Another approach used in the prior art is the use of movable mirrors in the optical path. In this approach, a pair of mechanically linked mirrors is used to selectively pass the optical flux through one path, which includes an intensifier, or through a second path, which does not have in intensifier. While this approach has merit in it's elimination of a redundant lens, it is not without drawbacks. One deficiency is in the difficulty of establishing precise physical positioning of the mirrors after they have been moved. This may be a serious deficiency if the system is used with a high magnification lens with a correspondingly small field of view, or if the system is used as a weapon sight. Another deficiency of a moving-mirror system is the mere presence of moving parts, which inevitably reduces the ruggedness and reliability of the system.

A related problem entails the need for image stabilization within the camera. Hand-held cameras are subject to the unavoidable vibration and tremors of the human hand. This problem is exacerbated when long-range telephoto lenses are employed; the viewed image is increasingly unstable as the magnification is increased. A variety of image stabilization techniques have been applied commercially. Typically, an orthogonal pair of gyroscopic sensors are disposed parallel to the image plane. The respective acceleration outputs are twice-integrated, then are used to correct the image position. An electronic technique, used in the Hitachi VM-I-181 camcorder, offsets the image sensor array scanning clocks so as to compensate for instantaneous image displacement. An electromechanical approach is used in some lens adapters, manufactured by Canon. In this technique, a planar, optically transmissive object is placed in the optical path, and is mechanically articulated to displace the optical path as necessary to maintain a constant image position in the image plane. While useful, these approaches have their disadvantages. The optical method adds illumination levels. The electronic method necessarily sacrifices a bordered area at the top and sides of the image, sufficient to cover the peak angular excursions of the image. This effectively reduces the overall resolution of the rendered image.

SUMMARY THE INVENTION

The subject invention is directed to a multi-imager camera, which is operable under extremes of illuminations, without the need for multiple optical paths. A single-lens system is employed, and a partially-reflective beamsplitting mirror is disposed to direct incoming images simultaneously to two or more sensors, respectively optimized for two different conditions, such as day/night operation or variable-zoom operation. This effectively overcomes the size and weight penalty incurred in a multiple-lens solution.

Beamsplitting mirrors are well-known optical devices. Such mirrors have been employed in a variety of optical systems over the years, including color cameras. Early color cameras used two beam splitting mirrors to trisect the optical path, optical filters for the three primary colors, and three monochrome sensor tubes. Beamsplitting mirrors are also used in a variety of other optical systems, such as interferometry. As a result, such mirrors are well-known, and are commercially available in a variety of sizes and transmittance/reflectance ratios.

Since the transmittance and reflectance of such mirrors are well controlled, it is possible to optimize a single-lens, dual-path system for dynamic range. For example, the daylight/color camera is used when illuminant levels are high. It is thus possible to select a mirror that diverts a small percentage of the incident light towards the daylight color camera, while diverting a large percentage of the incident light towards the low-light monochrome camera and/or intensifier.

The addition of an image intensifier enhances the sensitivity of the device under conditions of low illumination. The intensifier is placed in the optical path at a point beyond the beamsplitting mirror, and in whichever path the mirror 'favors'. For example, if the selected mirror is 90% transmissive and 10% reflective, then the intensifier is located behind the mirror where it can receive the preponderance of the incident optical energy. Conversely, if the mirror is 90% reflective and 10% transmissive, then the image intensifier is positioned to capture the reflected light from the mirror. In either case, the front surface of the intensifier must necessarily be located in the image plane of the lens, as extended or displaced by the beamsplitting mirror.

Image sensors and image intensifiers tend to have somewhat limited dynamic ranges. At high light levels, the devices may saturate or suffer physical damage. At very low light levels, the image produced by the device may become noisy, as previously discussed. This difficulty may be optical energy reaching the intensifier under high illumination.

In an alternative embodiment, digital image sensors are advantageously employed to increase the overall system resolution. Moreover, multiple digital sensors may share a common address and/or data bus, and may be selectively enabled. The selection may be automatic based on scene illumination, or may be manual.

In another enhancement, stabilization of the image produced by a digital sensor is effectuated by measuring and twice integrating the angular acceleration in two orthogonal axes parallel to the sensor's axes. Such instantaneous position information is then used to temporally offset the camera's scan timing signals, thus yielding a stable image. Alternatively, the instantaneous position information may generate an address offset in the read addresses used to access the imager array or its buffer, also yielding a stable image.

In yet another enhancement, the individual optical paths may use relay lenses of different magnifications. It is thus possible to selectively 'zoom' a desired scene by selecting one imager or the other. This allows zooming without moving parts in the optical path. It also allows the scene to be zoomed without loss of image resolution, as is the case in prior-art systems which zoomed by scanning a subset of a scanned image.

It is, therefore, an object and feature of the present invention to provide a dual day/night camera without the use of dual lenses.

It is an additional object and feature of the subject invention to provide such day/night operation through the use of a partially-reflective beamsplitting mirror.

It is another object and feature of the present invention to enhance the low-light performance of the day/night camera through the use of an image intensifier device.

It is another object and feature of the subject invention to employ digital image sensors, with the aim of providing enhanced image resolution.

It is another object and feature of the subject invention to effect digital imager selection by enabling or disabling one or more digital image sensors that share a common bus.

It is another object and feature of the subject invention to provide a means for selectively magnifying an image, without moving optical parts and without sacrifice of image resolution.

It is yet another object and feature of the subject invention to stabilize the captured images by sensing angular movements of the sensor and adjusting the scan timing or read addresses thereof. Other objects and features will be readily apparent from the accompanying drawings and detailed description of the preferred embodiment.

DETAILED DESCRIPTION OF THE PREFERRED EMBODIMENTS

Figure 1:
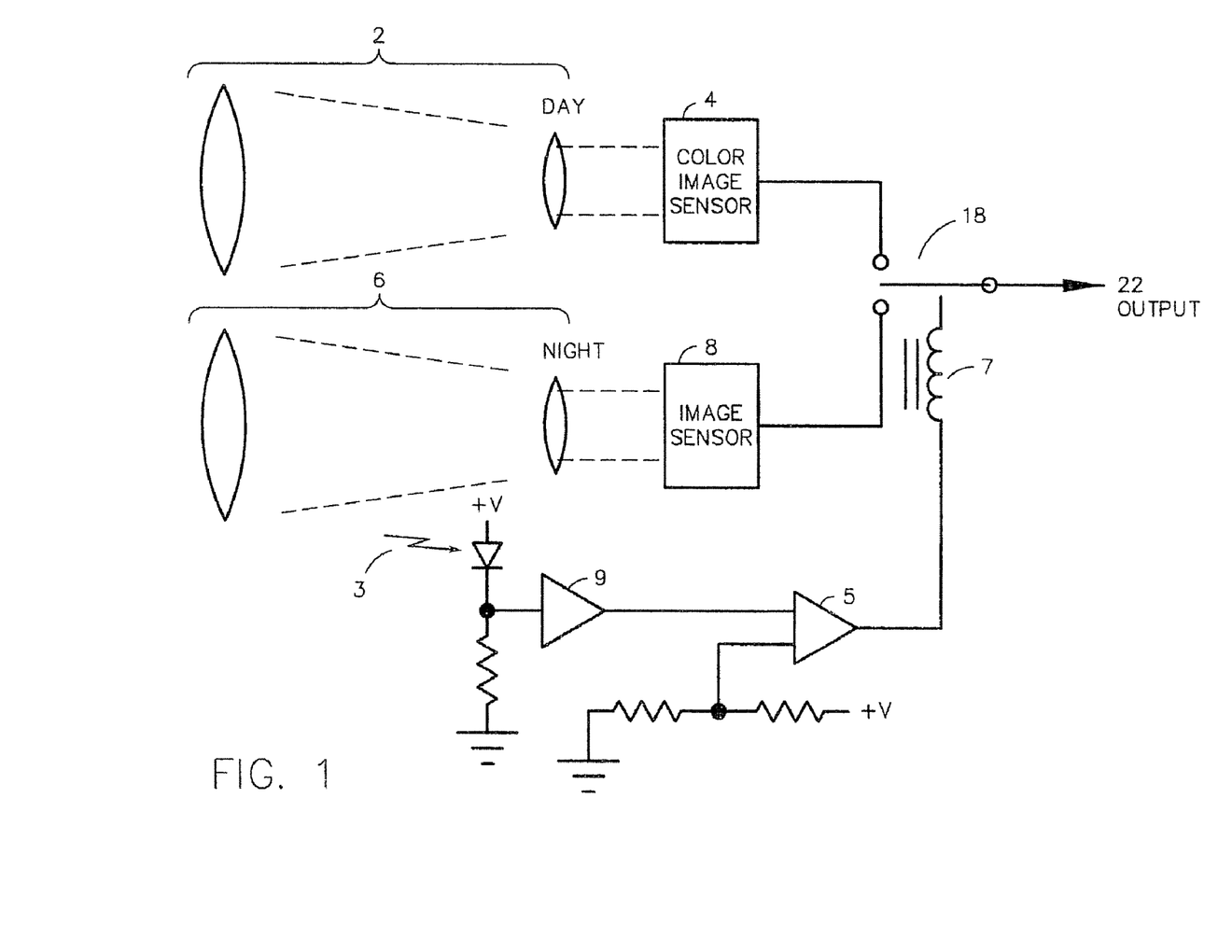
FIG. 1 depicts prior-art day/night cameras, which use dual optical paths and sensors. electrical switch to select the desired camera output.

Referring now to FIG. 1, a prior-art system is depicted, which uses two lenses and sensors to span the desired range of ambient illumination. Daylight operation is accomplished using daylight lens 2 and color image sensor 4. Nighttime scenes are captured by lens 6 and image sensor 8, which is a monochrome area sensor optimized for high sensitivity. Typically, the overall ambient illumination is detected by, as an example, a photodiode 3. The resulting signal is buffered by buffer 9, compared with a reference value by comparator 5, and used to drive a video source selection relay 7.

The disadvantages of such a typical system are readily apparent. The overall size, weight and cost are dramatically increased by the inclusion of the additional lens.

Figure 2:
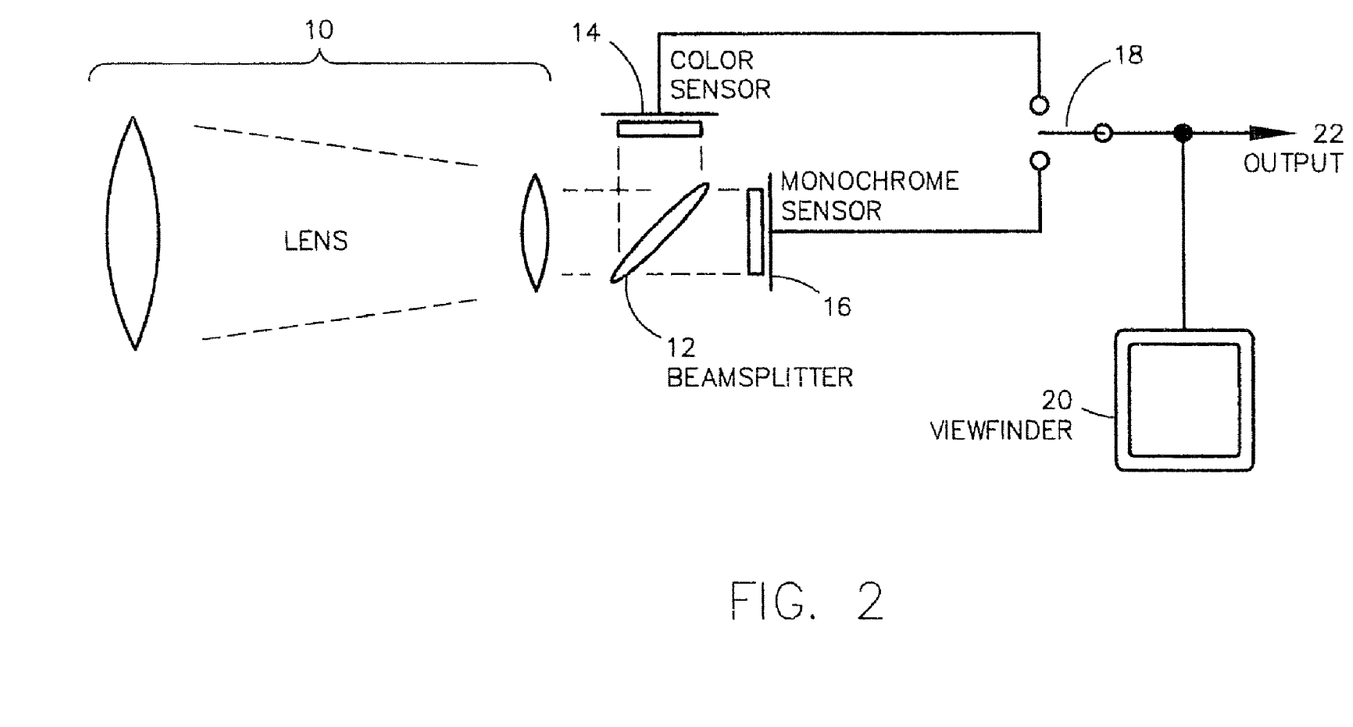
FIG. 2 depicts a day/night camera according to an embodiment.

An enhanced system, subject of the present invention, is depicted in FIG. 2. A single lens 10 is used to direct a desired scene onto the sensor optics, consisting of beamsplitting mirror 12, sensitive monochrome sensor 16 and color sensor 14. The relative positions of the respective sensors 14 and 16 may be exchanged, if necessary, without departing from the spirit and scope of the invention. The beamsplitting mirror 12 is partially reflective, in some proportion designed to optimize the desired optical behavior. For example, if absolute nighttime sensitivity is the highest goal of the design, then the beamsplitter may be 5 percent reflective and 95 percent transmissive, so as to maximize the amount of optical flux that reaches the nighttime sensor. The appropriate sensor output is selected by switch 18. Note that switch 18 could be automated as sensor output signal 22 is optionally displayed on viewfinder 20.

Figure 3:
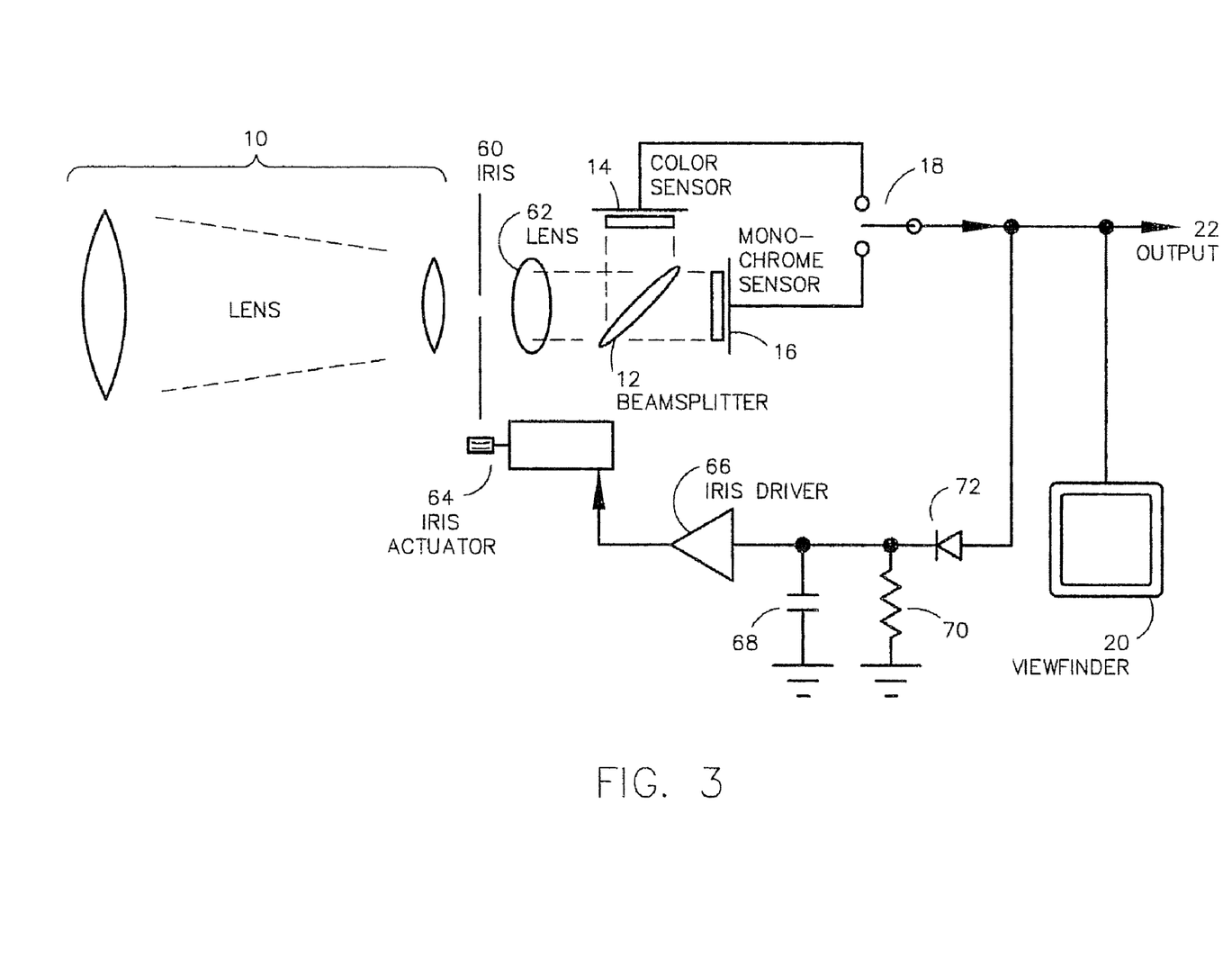
FIG. 3 depicts the day/night camera of FIG. 2, with an additional controlled-iris mechanism to provide increased dynamic range.

In FIG. 3, the basic system of FIG. 2 is enhanced with a driven iris, which serves to limit the amount of incident light that arrives at the monochrome sensor 16 or, indeed, at the color sensor 14. The overall output video signal 22 is sampled by diode 72, filtered by capacitor 68, given a time constant via resistor 70, and applied to iris driver 66. The iris driver, in turn, drives the iris actuator 64 and the iris 60, so as to limit the output signal 22 if it increases to some predetermined level. This serves to limit and stabilize the amount of light incident on the sensors 14 and 16.

Figure 4:
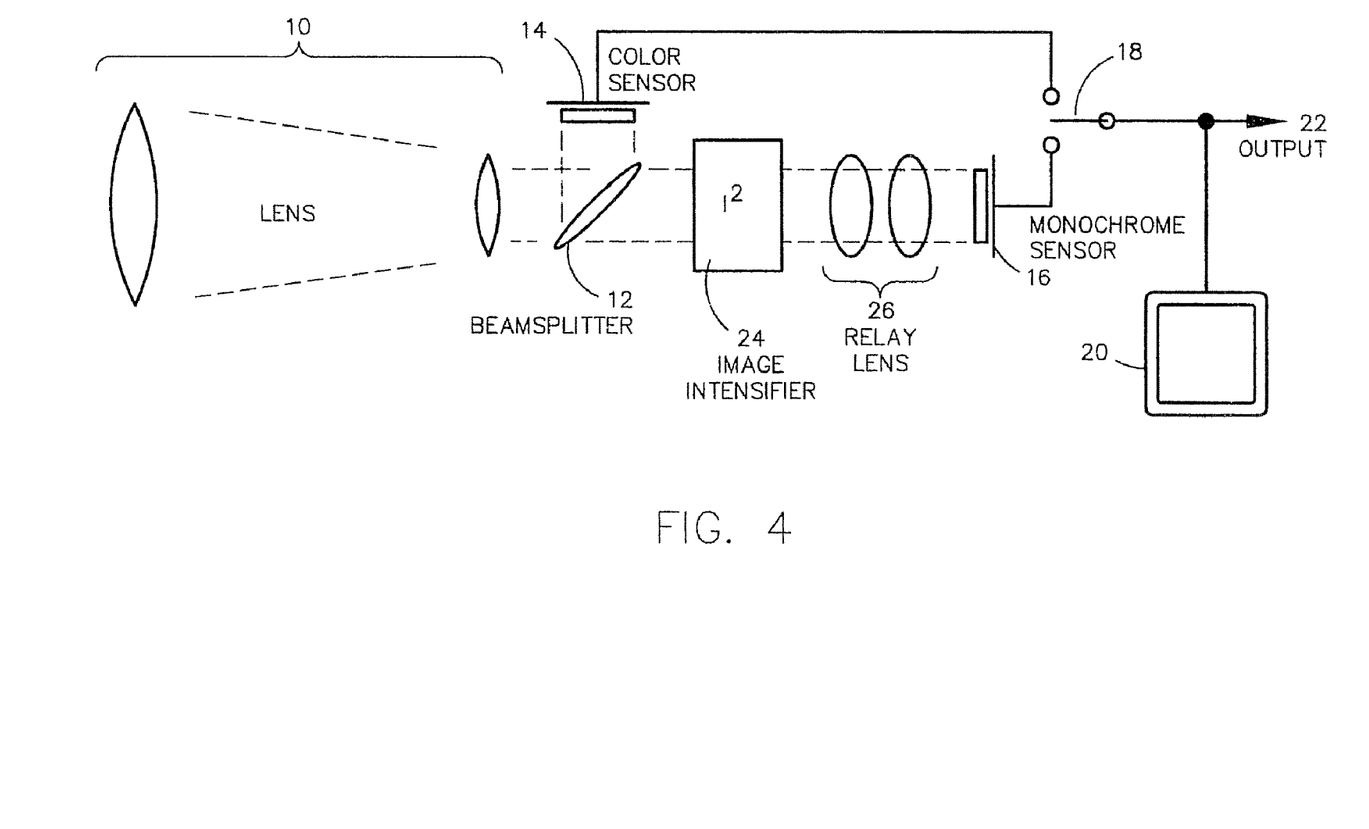
FIG. 4 depicts the day/night camera of FIG. 2, with the addition of an image-intensifier device to extend the low-light sensitivity of the system.

FIG. 4 depicts the basic system of FIG. 2, as supplemented by the inclusion of an image intensifier 24. Since the image on the rear surface of the image intensifier is a simple planar image, a relay lens system 26 may be necessary to transfer the image from the rear surface of the intensifier 24 to the monochrome sensor 16. Other techniques may also be employed to transfer the image, such as the fusion of fiber optic bundles between the intensifier and imager, or direct bonding of the intensifier to the imager.

Figure 5:
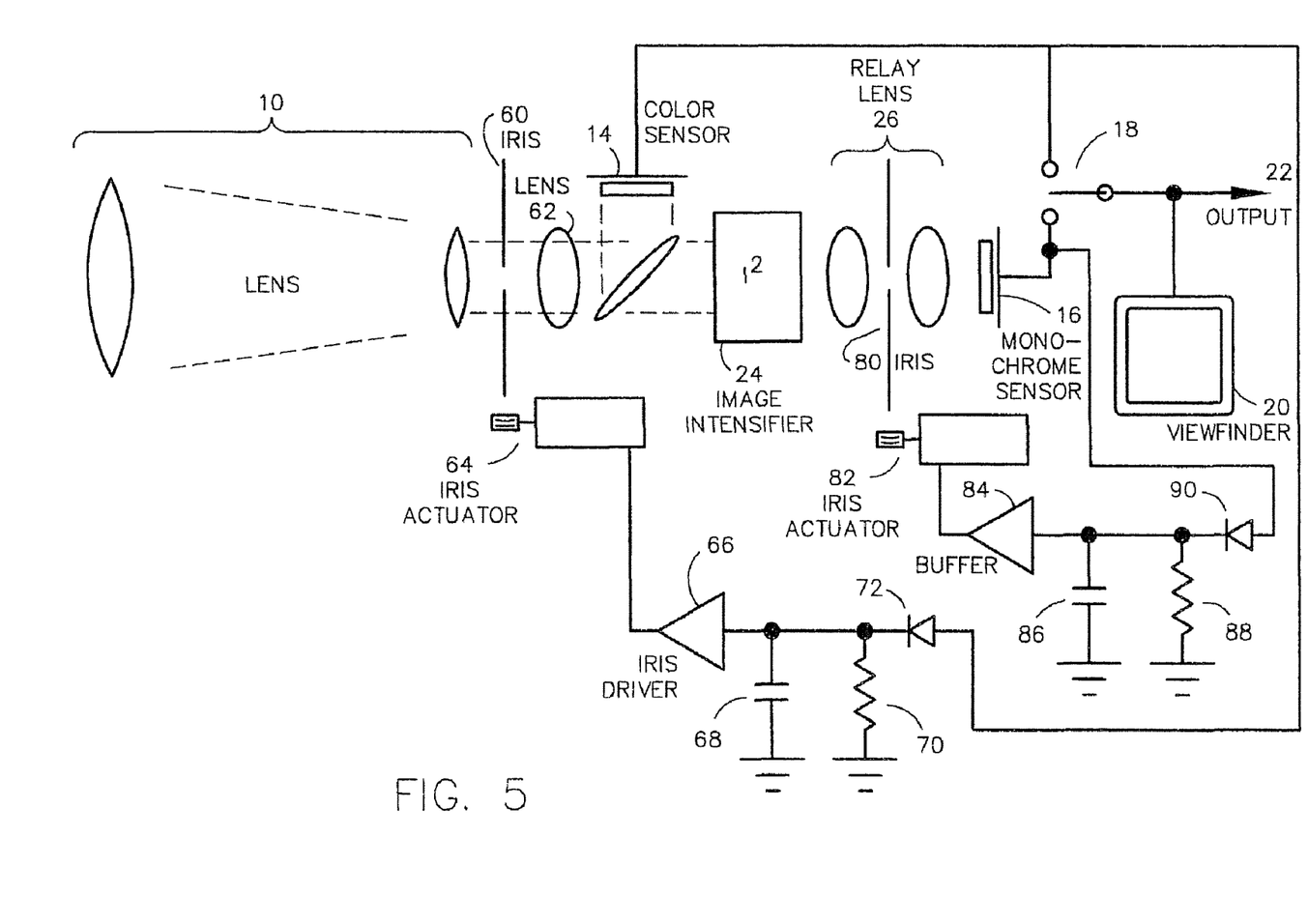
FIG. 5 depicts the day/night system of FIG. 4, with the addition of controlled irises to extend the dynamic range of the system, and to protect the image intensifier mechanism.

FIG. 5 depicts an enhancement to the system of FIG. 4. In FIG. 5, a second iris 80 is added, immediately in front of the monochrome sensor 16. This second iris is used to limit the amount of illumination reaching the sensitive monochrome sensor 16, preventing it from suffering from saturation when the intensifier output image is bright. The output signal from the monochrome sensor 16 is sampled by diode 90, filtered by capacitor 86, given a time constant by resistor 88, buffered by buffer 84, and drives the iris 80 via actuator 82. This effectively stabilizes and limits the output signal from the monochrome sensor 16. This approach frees the first iris 60 to control the overall output from the system, as depicted earlier in FIG. 3.

Figure 6:
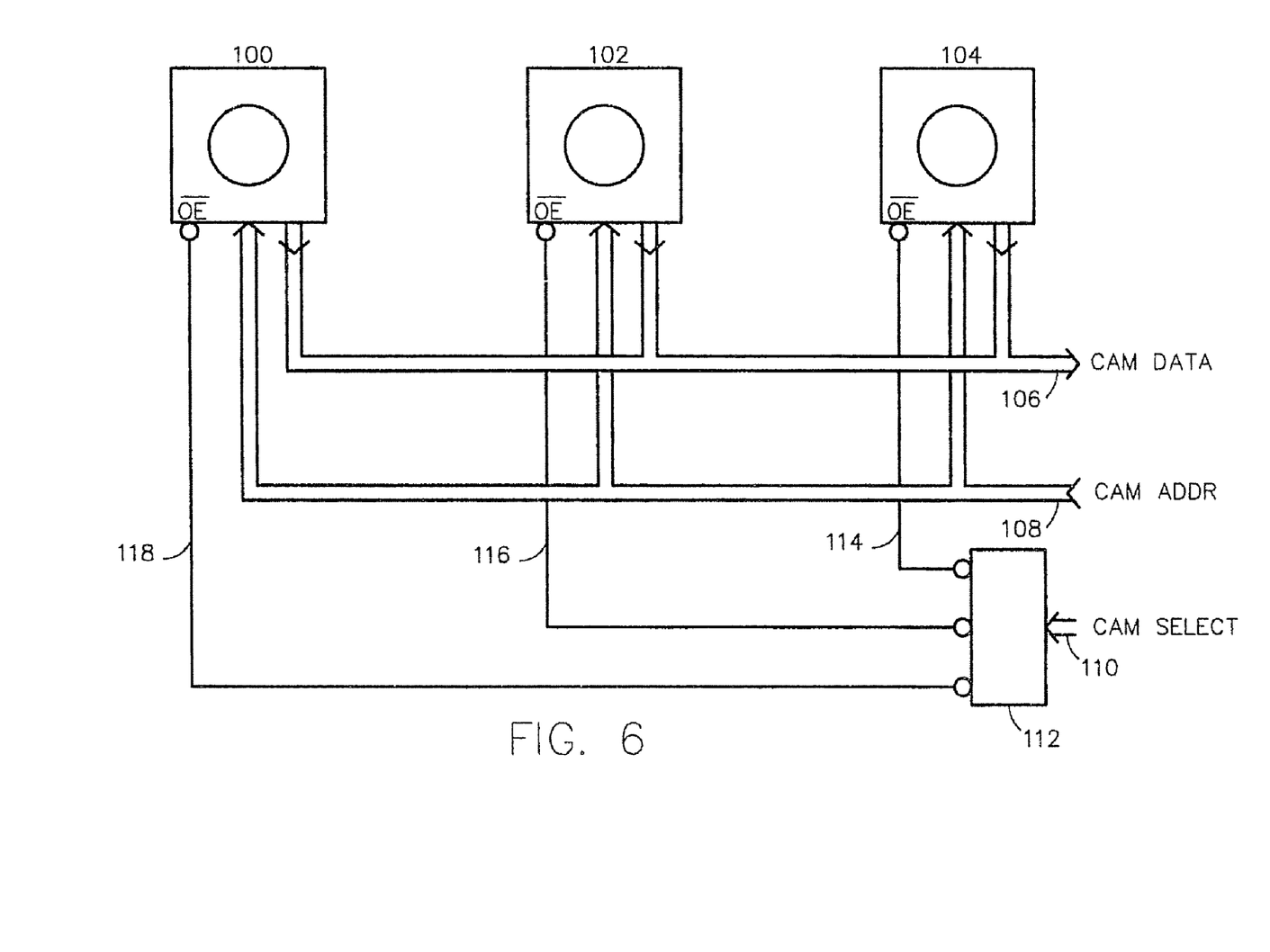
FIG. 6 depicts a multi-imager camera using digital imagers.

FIG. 6 depicts a multiple-imager version of the system. Multiple digital imagers 100, 102, and 104, share a common address bus 108 and data bus 106. A camera selection signal 110 is applied to multiplexer 112, which thereupon selects one of the sensors via enable lines 114, 116, and 118. This method allows the selection of a desired camera. The individual cameras 100, 102, and 104 may share a common optical path, as in previous examples which use a two-way beamsplitting mirror. The individual cameras 100, 102, and 104 may separately optimized for different purposes, such as day vs. night, 1× zoom vs. 2× zoom, etc.

Figure 7:
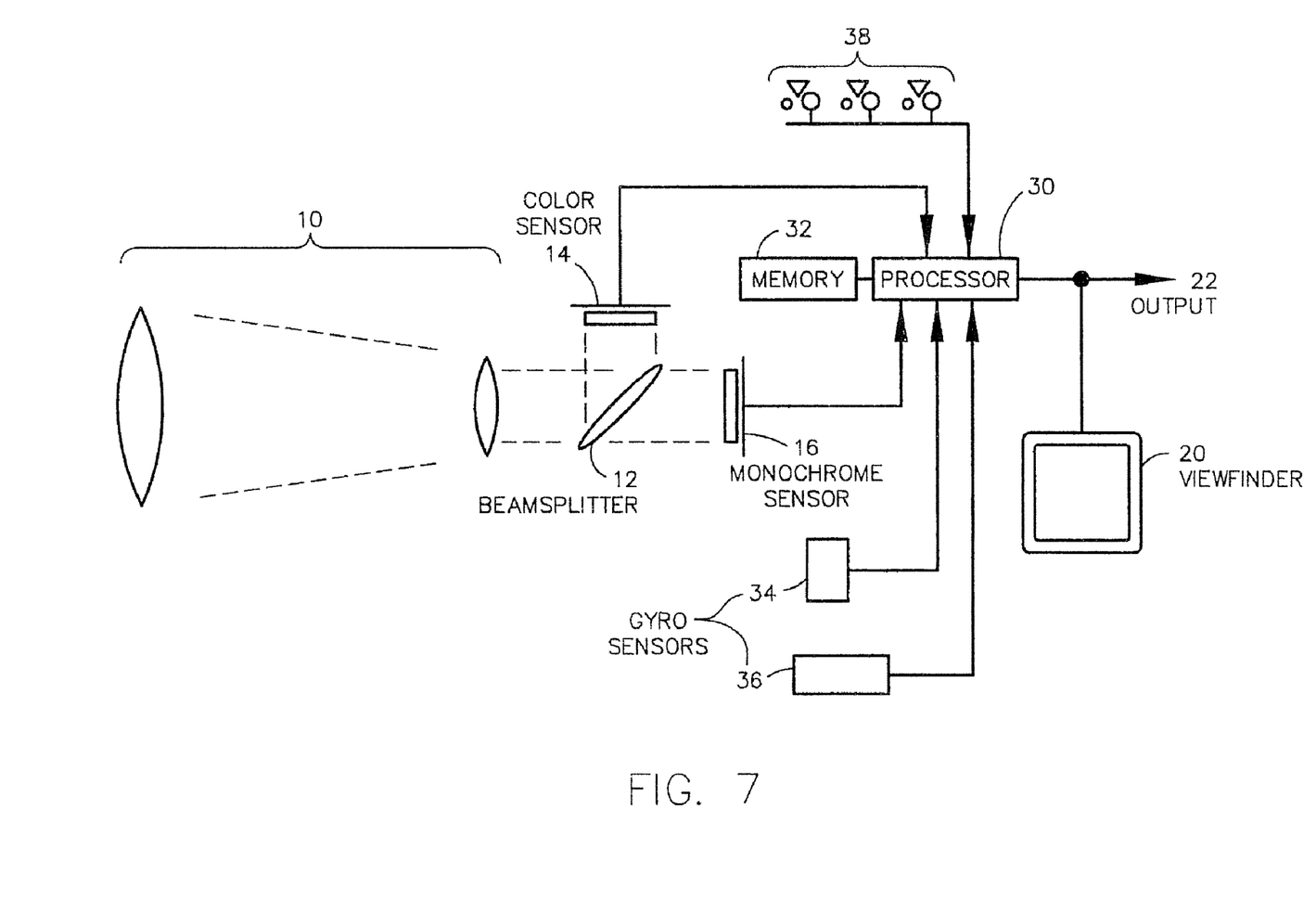
FIG. 7 depicts the day/night camera of FIG. 2, using digital image sensors.

FIG. 7 depicts an enhancement to the basic system of FIG. 2, wherein the analog sensors are replaced with high-resolution digital sensors 14 (color) and 16 (monochrome). As before, a image sensors 14 and 16. Images captured by these digital sensors are transferred to a suitable signal processor 30 with associated program/data memory 32. The processor 30, among other tasks, controls the scanning of the selected image sensor 14 or 16, and produces a corresponding output signal 22 in a desired signal format, such as NTSC, PAL, or a digital format such as D-1. A pair of orthogonal gyroscopic accelerometers 34 and 36 is disposed in a plane parallel to the image plane of the monochrome sensor 16. Angular accelerations detected by sensors 34 and 36 are twice-integrated by processor 30, to derive a knowledge of the instantaneous angular position of the device. This information is then used to temporally offset the image sensor scanning signals produced by the processor 30, effectively stabilizing the image position. Alternatively, the instantaneous position information previously described may be used to variably offset the read addresses driven to the imager or it's bugger, again effectively stabilizing the image. A variety of user input pushbuttons 38 are provided to allow user control of various camera parameters, for instance brightness, stabilization on/off, day/night mode, power on/off, etc.

An additional benefit of the dual-digital-sensor system of FIG. 7 is the ability to scan the imager in reverse-pixel or reverse-line order. This ability overcomes the optical problem imposed by the inclusion of the mirror; images that have been reversed vertically or horizontally by the mirror may be "re-reversed" electronically.

An additional benefit of the dual-digital-sensor system of FIG. 7 is the ability to 'fuse' the two images. The monochrome sensor 16 is used to provide scene luminance information, while the color sensor 14 is used to provide chrominance information. Note that, since luminance information is provided by camera 16, it is possible to use non-traditional color filters on color sensor 14 to increase its resolution and sensitivity. For example, a simple CrCb filter could be used on color sensor 14, with no pixels wasted for detecting luminance. This effectively increases the color resolution by one-third. The processor 30 may be used to scale and merge the two information streams into one signal. This method is not possible in prior-art systems, which used movable mirrors.

Figure 8:
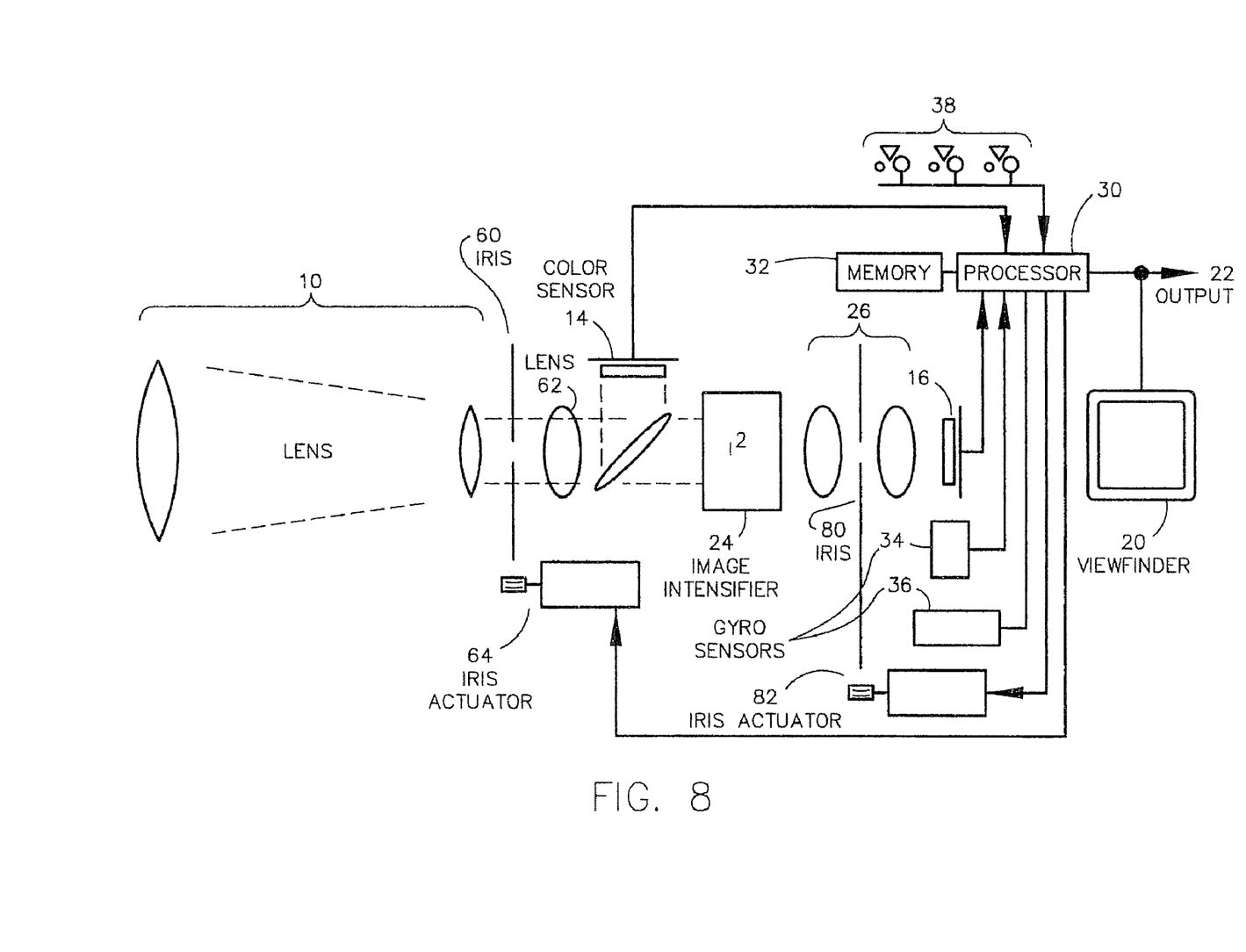
FIG. 8 depicts the digital day/night camera of FIG. 6, with the addition of an image-intensifier device and dual irises.
Figure 9:
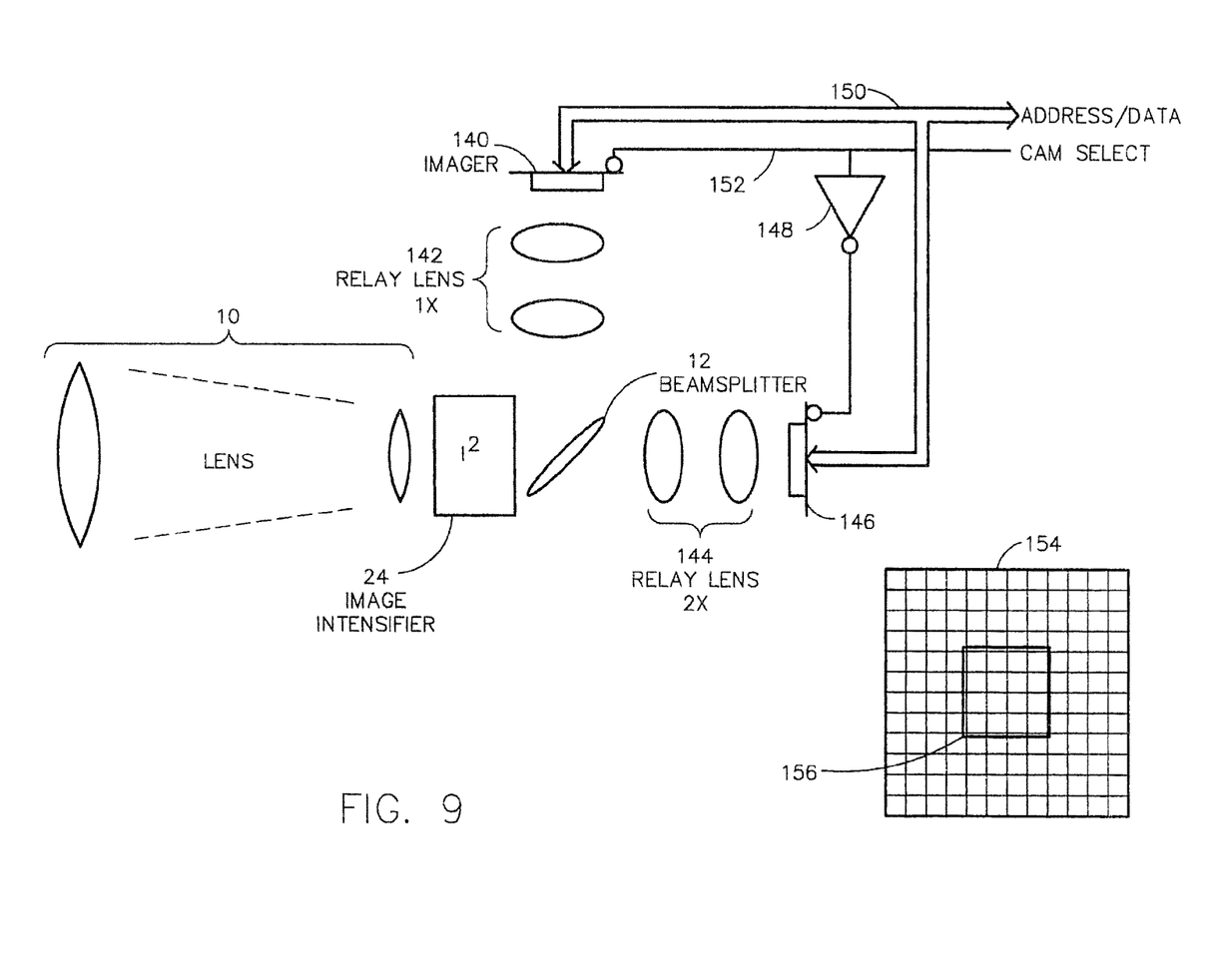
FIG. 9 depicts the use of the invention to selectively zoom an image

FIG. 8 depicts an enhancement to the digital system of FIG. 7, wherein the dual-iris arrangement of FIG. 5 is used to optimize the dynamic range of the system. As before, incident light reaching monochrome sensor 16 is controlled by iris 80, as driven by actuator 82 under processor control. This effectively prevents the sensitive monochrome imager from suffering saturation or overload. The intensifier 24 is protected by iris 60, driven by actuator 64, also under processor control. This iris serves to protect the intensifier device from excessive illumination. The dynamic range of both imagers may also be improved by the inclusion of automatic gain control, used in conjunction with the irises. without moving optical parts and without reduction of image resolution. While the example in FIG. 9 depicts a pair of digital imagers, analog imagers could be used to the same effect. A lens captures a desired scene and passes it to an optional image intensifier 24. The image thereupon passes to a beamsplitting mirror 12, thence to a pair of imagers 140 and 146 via relay lenses 142 and 144 respectively. The relay lenses are selected to have differing magnification ratios. In the example shown, relay lens 142 exhibits a magnification of 1:1, while relay lens 144 exhibits a magnification of 2:1. Imager 140 or imager 146 may be selected via CAM SELECT signal 152 and inverter 148. This effectively allows selection of a desired image, or selection of the same image with different magnification. As an example, lens 140 and imager 142 may render a scene 154, of some given angular field of view. When lens 144 and imager 146 are selected, a smaller field of view 156 is rendered, but at the same resolution as the previous, larger image.

Figure 10:
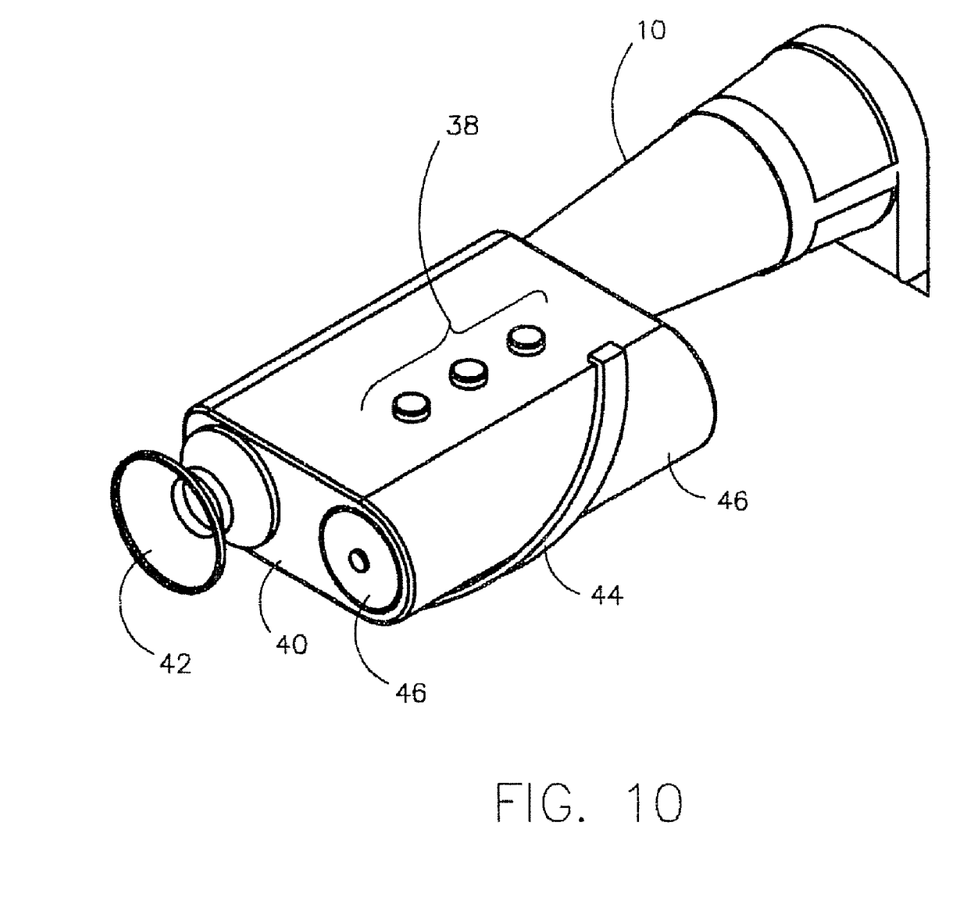
FIG. 10 is an example of a handheld embodiment of the system.

FIG. 10 depicts a preferred embodiment a handheld version of the device. A housing 46 contains a lens 10, user controls 38, eyepiece 42, battery compartment access panel 46, and carrying strap 44.

While certain features and embodiments of the invention have been described in detail herein it should be understood that the invention includes all improvements, modifications

What is claimed is:

1. A camera, comprising:
    a single lens system adapted to direct a beam, the single lens system providing a directed beam;
    an iris adapted to limit an amount of the directed beam, the iris providing a limited amount of the directed beam;
    a mirror adapted to receive and distribute the limited amount of the directed beam, the mirror providing a first portion of the distributed beam and a second portion of the distributed beam;
    a first digital image sensor adapted to receive the first portion of the distributed beam;
    a second digital image sensor adapted to receive the second portion of the distributed beam;
    an image intensifier adapted to receive and intensify at least one of the following:
        the limited amount of the directed beam,
        the first portion of the distributed beam, and
        the second portion of the distributed beam;
    a processor adapted to receive an output from at least one of the first image sensor and the second image sensor, the processor being adapted to provide an iris driver control signal to an iris driver;
    a multiplexer adapted to merge characteristics of output provided by the first digital image sensor and the second digital image sensor;
    an iris driver adapted to operate the iris, the iris driver receiving the iris driver control signal; and
    where the iris driver control signal is provided to establish the limited amount of the directed beam to prevent overexposure to at least one of the following:
        the image intensifier,
        the first digital image sensor, and
        the second digital image sensor.

2. A camera according to claim 1 and further comprising:
    the processor being operable to control a scanning of the first digital image sensor and the second digital image sensor,
    the processor being adapted to receive scanned output of the first digital image sensor, the processor being adapted to receive scanned output of the second digital image sensor, the processor being adapted to produce an output.

3. A camera according to claim 1 and further comprising:
    the processor being further adapted to twice integrate the angular accelerations to derive an instantaneous angular position of the camera; and
    the processor being further adapted to temporally offset the scanning, thereby stabilizing the output based on the instantaneous angular position.

4. A camera according to claim 1 and further comprising:
    the first digital image sensor being a color image sensor providing chrominance information;
    the second digital image sensor being a monochrome image sensor providing luminance information; and
    the processor being operable to control a scanning of the chrominance information and the luminance information;
    the processor being operable to scale the chrominance information and the luminance information; and
    the processor being operable to merge the chrominance information and the luminance information.

* * * * *